United States Patent
Liang et al.

(10) Patent No.: US 11,132,786 B2
(45) Date of Patent: Sep. 28, 2021

(54) BOARD DEFECT FILTERING METHOD BASED ON DEFECT LIST AND CIRCUIT LAYOUT IMAGE AND DEVICE THEREOF AND COMPUTER-READABLE RECORDING MEDIUM

(71) Applicant: Industrial Technology Research Institute, Hsinchu (TW)

(72) Inventors: Ming-Kaan Liang, Hsinchu (TW);
An-Chun Luo, Taichung (TW);
Yu-Shan Deng, Hsinchu County (TW);
Chih-Ming Shen, New Taipei (TW);
Ming-Ji Dai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 182 days.

(21) Appl. No.: 16/134,986

(22) Filed: Sep. 19, 2018

(65) Prior Publication Data

US 2019/0213725 A1    Jul. 11, 2019

Related U.S. Application Data

(60) Provisional application No. 62/613,778, filed on Jan. 5, 2018.

(30) Foreign Application Priority Data

Jul. 3, 2018    (TW) .................................. 107122979

(51) Int. Cl.
*G06T 7/00*    (2017.01)
*G06N 3/08*    (2006.01)
*G06K 9/62*    (2006.01)

(52) U.S. Cl.
CPC ............ *G06T 7/001* (2013.01); *G06K 9/6267* (2013.01); *G06N 3/08* (2013.01);
(Continued)

(58) Field of Classification Search
None
See application file for complete search history.

(56) References Cited

U.S. PATENT DOCUMENTS 7,110,591 B2    9/2006    Neubauer et al.
7,181,059 B2    2/2007    Duvdevani et al.
(Continued)

FOREIGN PATENT DOCUMENTS

CN    101852741    10/2010
CN    106596580    4/2017
(Continued)

*Primary Examiner* — Mohammad H Ghayour
*Assistant Examiner* — Pawan Dhingra
(74) *Attorney, Agent, or Firm* — JCIPRNET

(57) ABSTRACT

A board defect filtering method is provided. The method includes: receiving a defect list; obtaining a plurality of defect images of a plurality of defect records on the defect list; receiving a circuit layout image; analyzing a defect location of a first defect image of the plurality of defect images according to the circuit layout image; cropping the first defect image to obtain a first cropped defect image according to the defect location; inputting the first cropping defect image to a defect classifying model; and determining whether the first defect image is a qualified product image or not according to an output result of the defect classifying model.

9 Claims, 3 Drawing Sheets

(52) U.S. Cl.
CPC ............ *G06T 2207/10024* (2013.01); *G06T 2207/20084* (2013.01); *G06T 2207/20132* (2013.01); *G06T 2207/30141* (2013.01)

(56) References Cited

U.S. PATENT DOCUMENTS

| | | | |
|---|---|---|---|
| 7,317,522 | B2 | 1/2008 | Nedivi |
| 2002/0168097 | A1 | 11/2002 | Neubauer et al. |
| 2004/0126005 | A1* | 7/2004 | Duvdevani ........ G06K 9/00973 382/149 |
| 2004/0157134 | A1* | 8/2004 | Kim ................... G03F 1/72 430/5 |
| 2005/0254699 | A1* | 11/2005 | Sano .................. G06T 7/001 382/149 |
| 2007/0067678 | A1 | 3/2007 | Hosek et al. |
| 2007/0156379 | A1 | 7/2007 | Kulkarni et al. |
| 2009/0169094 | A1* | 7/2009 | Tsai .................. G06T 7/0004 382/149 |
| 2013/0174102 | A1* | 7/2013 | Leu .................. G05B 19/41875 716/52 |
| 2014/0219545 | A1* | 8/2014 | Sugiyama ............ G06T 7/001 382/149 |
| 2018/0089818 | A1* | 3/2018 | Kobayashi ............. G06T 7/001 |
| 2019/0155164 | A1* | 5/2019 | Chen ................... G03F 7/7065 |
| 2019/0244375 | A1* | 8/2019 | Choi ................... G06N 3/0454 |
| 2020/0005258 | A1* | 1/2020 | Miller ................. G06F 40/205 |

FOREIGN PATENT DOCUMENTS

| | | |
|---|---|---|
| CN | 107093174 | 8/2017 |
| CN | 107389701 | 11/2017 |
| TW | 479917 | 3/2002 |
| TW | I244359 | 11/2005 |
| TW | 201329909 | 7/2013 |
| TW | I585398 | 6/2017 |

* cited by examiner

BOARD DEFECT FILTERING METHOD BASED ON DEFECT LIST AND CIRCUIT LAYOUT IMAGE AND DEVICE THEREOF AND COMPUTER-READABLE RECORDING MEDIUM

CROSS-REFERENCE TO RELATED APPLICATION

This application claims the priority benefits of U.S. provisional application Ser. No. 62/613,778, filed on Jan. 5, 2018 and Taiwan application Ser. No. 107122979, filed on Jul. 3, 2018. The entirety of each of the above-mentioned patent applications is hereby incorporated by reference herein and made a part of this specification.

TECHNICAL FIELD

The disclosure relates to an inspection technique, and particularly relates to a board defect filtering method, a device thereof, and a computer-readable recording medium.

BACKGROUND

In an industrial manufacturing process, a finished circuit board is further subjected to an automated optical inspection (AOI) process to find out a circuit board that may have a defect.

To ensure the yield rate of printed circuit boards, the criteria set for defect inspection are very strict. Therefore, while an AOI machine can effectively detect a defective circuit board, the chance of misjudgment is also very high. Therefore, operating personnel is required during the manufacturing process in order to double-check the circuit board determined as detective by the AOI machine. How to maintain the yield rate of printed circuit boards while lowering the number of misjudgments in such a process to reduce the workload for manually double-checking the boards remains an issue to work on.

SUMMARY

The disclosure provides a board defect filtering method, a board defect filtering device, and a computer readable recording medium. In the method, the device, and the computer readable recording medium, the number of misjudgments on a defect list is lowered and the workload for manually double checking is reduced.

An embodiment of the disclosure provides a board defect filtering method including the following. A defect list is received. A plurality of defect images of a plurality of defect records on the defect list are obtained. A circuit layout image is received. A defect location of a first defect image of the defect images is analyzed according to the circuit layout image. The first defect image is cropped according to the defect location of the first defect image to obtain a first cropped defect image. The first cropped defect image is input to a defect classifying model. In addition, whether the first defect image is a qualified product image or an unqualified product image is determined according to an output result of the defect classifying model.

A board defect filtering device according to an embodiment of the disclosure includes an input section, a storage section, and a processing section. The input section receives a defect list and a circuit layout image. The defect list has a plurality of defect records. The input section further obtains a plurality of defect images of the defect records. The storage section stores a plurality of modules. The processing section is connected to the input section and the storage section. The processing section executes a circuit comparing module and a defect classifying module. The circuit comparing module analyzes a defect location of a first defect image of the defect images according to the circuit layout image, and crops the first defect image according to the defect location of the first defect image to obtain a first cropped defect image. The defect classifying module inputs the first cropped defect image to a defect classifying model, and determines whether the first defect image is a qualified product image or an unqualified product image according to an output result of the defect classifying model.

An embodiment of the disclosure provides a computer readable recording medium. The computer readable recording medium stores at least one program code, and when an electronic device loads and executes the program code, the board defect filtering method may be completed.

Based on the above, the board defect filtering device and the board defect filtering method according to the embodiments of the disclosure are able to determine the type to which the defect of the defect image belongs by cross-comparing the circuit layout image and the defect list, thereby determining whether the defect image is a qualified product image or an unqualified product image.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
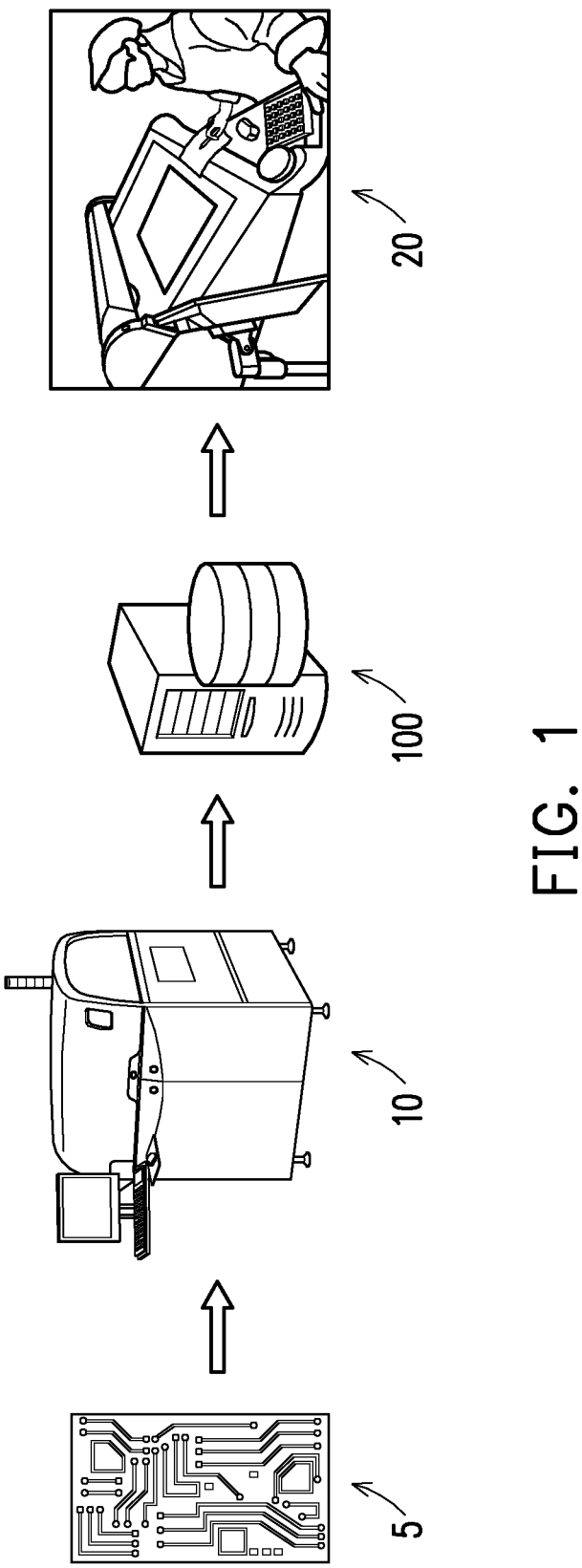
FIG. 1 is a schematic view illustrating a board defect filtering device according to an exemplary embodiment of the disclosure.

FIG. 1 is a schematic view illustrating a board defect filtering device according to an exemplary embodiment of the disclosure.

Referring to FIG. 1, in the flow of an industrial manufacturing process, a finished circuit board 5 is transmitted to an automated optical inspection (AOI) device 10 for preliminary defect inspection. Circuit boards with defects are mainly circuit boards unable to carry out an expected function when powered due to a short circuit, a broken circuit, or the like occurring in the circuit boards due to errors in the manufacturing process. By scanning the circuit board 5 with an optical component, the AOI device 10 may determine the completeness of a circuit with a scan image and thereby find out a potentially defective circuit board.

The defective circuit boards and the defect locations found through inspection by the AOI device 10 are sorted into a defect list and input to a verified repaired system (VRS) 20 to filter out false alarm defects. The VRS 20 may move the optical component to the defect location to obtain an image. Then, whether the defect is indeed a defect or not is determined through manual image interpretation.

However, since the criteria of defects set in the AOI device 10 are easy to satisfy, there are quite a number of false alarm defects. For example, when the circuit board 5 is found with a defect such as dander, dirt, or residing glue being attached to the circuit board 5, the AOI device 10 may determine the circuit board 5 as defective due to a shadow on the image. However, a majority of these defects may be removed after the circuit board is cleaned or packaged, so these defects belong to false alarm defects. In actual production, such false alarm defects may account for 97% of the defects on the defect list. Particularly, defects such as attachment of dander, dirt, residing glue, etc., may account for as high as 60% of the defects on the defect list. In order to shorten the defect list to reduce the workload for double-checking manually, the disclosure further provides a board defect filtering device 100. To begin with, the defect list generated by the AOI device 10 is input to the board defect filtering device 100 for filtering to reduce the number of misjudgments on the defect list. Then, the reduced defect list is transmitted to the VRS 20 for manual checking.

Figure 2:
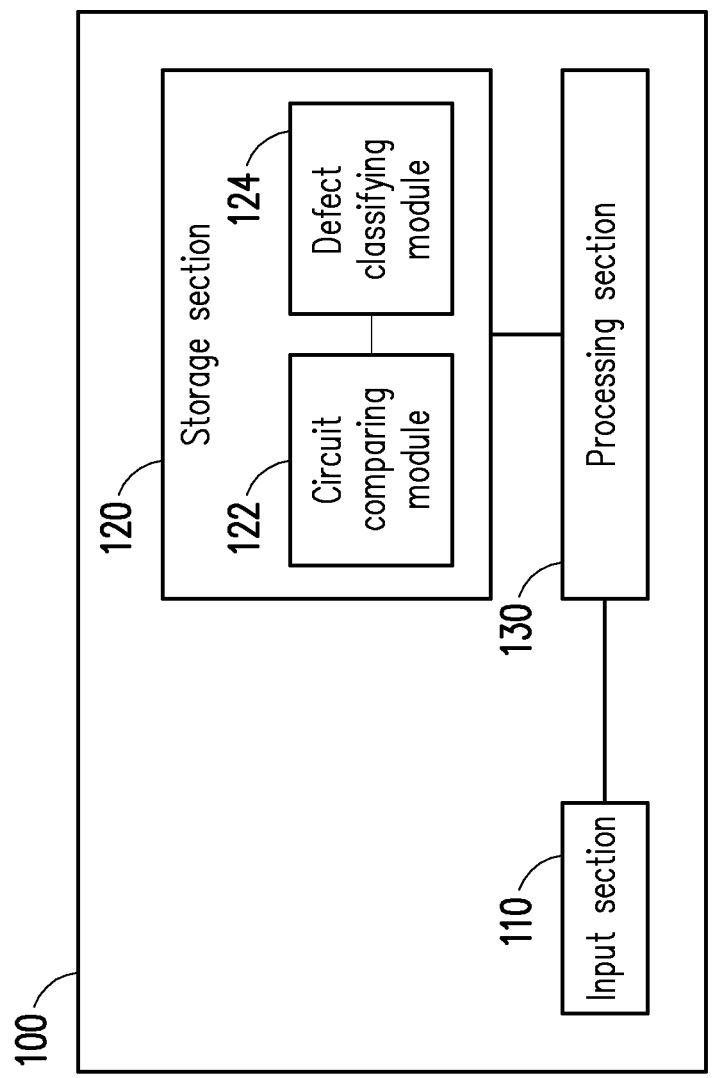
FIG. 2 is a schematic view illustrating a board defect filtering device according to an exemplary embodiment of the disclosure.

FIG. 2 is a schematic view illustrating a board defect filtering device according to an exemplary embodiment of the disclosure.

Referring to FIG. 2, the board defect filtering device 100 includes an input section 110, a storage section 120, and a processing section 130.

The input section 110 serves to receive the defect list, defect images, and a circuit layout image. In an exemplary embodiment of the disclosure, the input section 110 is implemented as a communication chip. For example, the board defect filtering device 100 is connected to the AOI device 10 and the user's terminal device through communication of the communication chip. Accordingly, after the AOI device 10 finishes checking the circuit board, the defect list and the defect images are directly transmitted and input to the board defect filtering device 100. Besides, the user may also choose a circuit layout image in the terminal device and input the circuit layout image to the board defect filtering device 100 through transmission of the communication chip. In another exemplary embodiment of the disclosure, various input ports, such as a universal serial bus (USB), a serial port, a FireWire (which adopts the IEEE 1394 standard), a VME bus, etc., may be adopted as the input section 110 of the board defect filtering device. Meanwhile, physical components, such as a keyboard, a mouse, a touch panel, etc., may also be used together, so as to receive the user's operation.

The storage section 120 serves to store various modules as well as various data and program codes required for operating the board defect filtering device 100. Particularly, in an embodiment of the disclosure, the storage section 120 has a circuit comparing module 122 and a defect classifying module 124.

The circuit comparing module 122 may analyze a defect location of a first defect image of the defect images according to the circuit layout image, and crop the first defect image according to the defect location of the first defect image, so as to obtain a first cropped defect image.

The defect classifying module 124 may input the first cropped defect image to a defect classifying model, and determine whether the first defect image is a qualified product image or an unqualified product image according to an output result of the defect classifying model. How the circuit comparing module 122 and the defect classifying module 124 complete the operation of the board defect filtering device 100 will be described in subsequent paragraphs.

The storage section 120 can be implemented by any type of fixed or movable random access memory (RAM), read only memory (ROM), flash memory, the like or a combination of the aforementioned elements, the disclosure is not limited thereto.

The processing section 130 is connected to the input section 110 and the storage section 120. The processing section 130 serves to carry out various computations required by the board defect filtering device 100. Particularly, the processing section 130 may operate the circuit comparing module 122 and the defect classifying module 124, so as to execute a board defect filtering method according to the embodiments of the disclosure. In the embodiments of the disclosure, the processing section 130 may be a central processing unit (CPU) or other programmable general-purpose or specific-purpose microprocessors, digital signal processors (DSP), programmable controllers, application specific integrated circuits (ASIC), or other similar devices or a combination thereof. Nevertheless, the disclosure is not limited thereto.

It should be noted that, in an exemplary embodiment of the disclosure, the board defect filtering device 100 is operated as an independent device. Alternatively, in another embodiment of the disclosure, the board defect filtering device 100 may be integrated with the AOI device 10 to serve as a sub-device in an AOI system. In other embodiments of the disclosure, the board defect filtering device 100 may also be combined with the VRS 20 to serve as a sub-device in a VRS system. However, the disclosure is not limited thereto.

Figure 3:
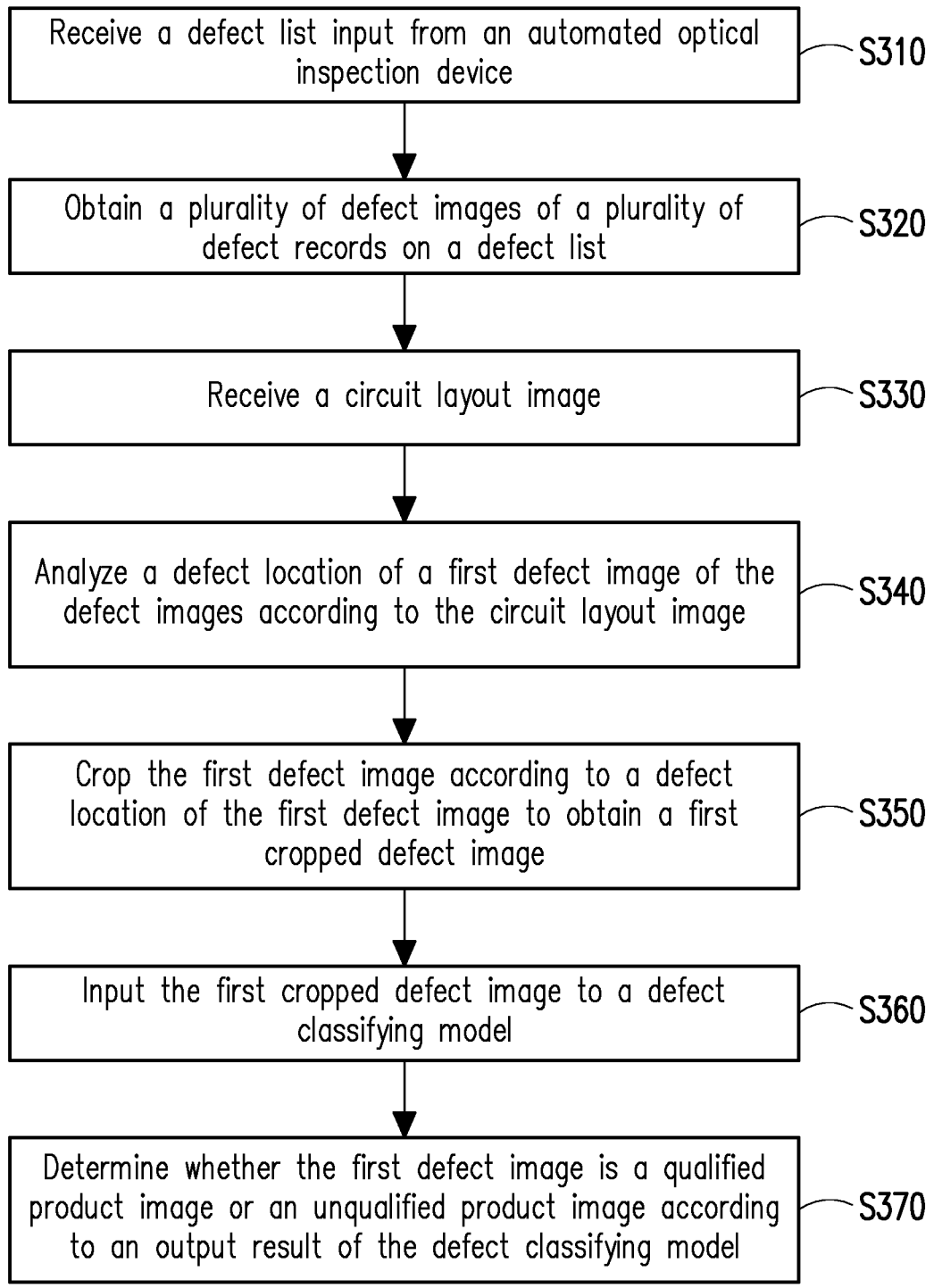
FIG. 3 is a flowchart illustrating a board defect filtering method according to an exemplary embodiment of the disclosure.

FIG. 3 is a flowchart illustrating a board defect filtering method according to an exemplary embodiment of the disclosure.

In the following, details of the board defect filtering device carrying out the board defect filtering method according to the embodiments of the disclosure are described with reference to FIGS. 1 to 3.

First of all, the AOI device 10 may scan a circuit board through an optical component (such as a camera) and generate an image corresponding to a scanned region. The AOI device 10 may determine whether a defect is present according to the image of the scanned region. When a defect is present, the AOI device 10 may record the defect and the defect location in the defect list to form a defect record. Since the size of the circuit board may be larger than the size that the optical component is able to scan, the AOI device 10 may inspect whether a defect is present on the circuit board in a region-by-region manner. When there are defects in multiple regions, the defect list may store multiple defect records. In addition, the AOI device 10 may also store defect images corresponding to the defect records. After finishing checking the circuit board, the AOI device 10 may transmit the defect list to the board defect filtering device 100.

At Step S310, the input section 110 receives the defect list input by the AOI device 10.

At Step S320, the input section 110 obtains the multiple defect images of the multiple defect records on the defect list. According to an exemplary embodiment of the disclosure, the input section 110 receives the defect images input from the AOI device 10. However, in other embodiments of the disclosure, the AOI device 10 may store the defect images in a remote storage device. The input section 110 may follow an instruction of the processing section 130 and obtain corresponding defect images from the remote storage device according to the defect list and the defect records. However, it should be noted that the disclosure shall not be construed as being limited to the above embodiment.

At Step S330, the input section 110 receives the circuit layout image. The circuit layout image is a circuit design chart corresponding to the circuit board under inspection. For example, the circuit layout image and the circuit board under inspection may correspond to the same part number. In an exemplary embodiment of the disclosure, the circuit layout image is in a computer-aided manufacturing format (.CAM format). However, the disclosure is not limited thereto. In addition, in an exemplary embodiment of the disclosure, the circuit layout image is stored in the remote storage device, and through various user commands, the circuit layout image is transmitted to the board defect filtering device via the input section 110.

With the defect list, the defect images, and the circuit layout image, the processing section 130 may operate the circuit comparing module 122 and the defect classifying module 124 and further determine whether the circuit board under inspection is a qualified product.

Specifically, at Step S340, the circuit comparing module 122 analyzes a defect location of a first defect image in the defect images according to the circuit layout image. Specifically, upon inspecting and finding a defect, the AOI device 10 may record the defect location in the defect records on the defect list. However, when the AOI device 10 takes the defect image, there may be a deviation in the taken image due to a deviation of the locations of the optical component and the circuit board or the range of the image taken by the optical component. Therefore, in an embodiment of the disclosure, the circuit comparing module 122 may analyze the defect location of the first defect image in the defect images according to the circuit layout image, so as to carry out an anti-deviation conversion on the circuit layout image. Details of carrying out the anti-deviation conversion will be described in subsequent paragraphs.

At Step S350, the circuit comparing module 122 crops the first defect image according to the defect location of the first defect image, so as to obtain the first cropped defect image. Specifically, the AOI device 10 may adopt the range captured by the optical component as the first defect image when taking the first defect image. However, in actual practice, the defects found through inspection by the AOI device 10 may be, for example, dander, dirt, incomplete release of a film, etc., and the sizes of these defects are very small. In the case where the majority of the first defect image is normal circuits, the chance of omission of or misjudgment on a defect may increase. Therefore, the circuit comparing module 122 may adopt a region of interest (ROI) cropping technique to form the first cropped defect image by cropping the first defect image according to the defect location.

It should be noted that, in an exemplary embodiment of the disclosure, the first cropped defect image needs to meet a criterion of minimum image, such as a size of 32 pixels by 32 pixels. In other words, if the range of the defect is smaller than the size of 32 pixels by 32 pixels, the circuit comparing module 122 may still obtain an image of 32 pixels by 32 pixels through cropping, or enlarge the defect to the size of 32 pixels by 32 pixels after obtaining the range of the defect through cropping. However, if the range of the defect is greater than 32 pixels by 32 pixels, the circuit comparing module 122 may still carry out cropping according to the size of the range of the defect, such as performing cropping by expanding 10 pixels from the profile of the defect. However, the disclosure is not limited to the above embodiment. The method and the size of cropping may be designed according to the actual practice. According to an experiment of the disclosure, compared with the result of defect images without cropping, the accuracy of defect classification was improved from 50.3% to 99.7% through cropping the defect images.

At Step S360, the defect classifying module 124 may input the first cropped defect image to a defect classifying model for classification. The types of defects include, for example, dander, dust, incomplete release of a film, normal, broken circuit, short circuit, etc. The types in the classification of defects may be added or removed according to practical needs, and the disclosure is not limited thereto.

In an exemplary embodiment of the disclosure, the defect classification model is a convolutional neural network model. In other words, when the defect classifying module 124 inputs the first cropped defect image to the convolutional neural network model, the first cropped image may pass through a convolutional layer for extracting a feature, a rectified linear units layer (ReLU layer) for enhancing a function property, and a pooling layer for reducing the size of data, so as to obtain a defect feature (e.g., the profile of the defect) of the defect. It should be noted that, in an embodiment of the disclosure, the pooling layer may adopt a max pooling function and output the maximum of the feature. Details about the convolutional layer, the ReLU layer, and the pooling layer can be understood by people having ordinary skills in the art according to the conventional art and thus will not be repeated in the following. Besides, according to different designs, the convolutional layer, the ReLU layer, and the pooling layer may be periodically adopted in the convolutional neural network model. In an actual example, the convolutional neural network model adopts the framework of AlexNet 8 Layer for computation. However, the disclosure is not limited thereto.

After the first cropped defect image passes through the convolutional neural network model and the defect feature is obtained, the defect classifying module 124 may further input the defect feature to a classifier. The classifier determines to which defect type the defect belongs according to the defect feature and generates an output result accordingly.

In another exemplary embodiment of the disclosure, the defect classifying model may also be a counter propagation network (CPN) model. Specifically, the CPN model has a feature quantifying layer and a defect classifying layer. In the feature quantifying layer, the user may arbitrarily define a feature to be quantified. In addition, after performing the training processes of inputting defect images, analyzing defect images, assigning defect labels by the user, etc. for multiple times, the CPN model may learn by itself to establish a set of reference image features The types of the quantifying features include, for example, a central point location, an area of a region, a length of a circumference, completeness of a feature, a degree of extension, a shape of a feature, a color of a feature, a color histogram, etc. Among these types, the length of a circumference, the completeness of a feature, the degree of extension, and the color histogram are important types. Therefore, when the defect classifying module 124 inputs the first cropped defect image to the CPN model, the profile of the defect in the first cropped defect image is extracted, and the first cropped defect image is analyzed according to the profile of the defect to generate a defect quantifying feature. Then, at the defect classifying layer, the defect quantifying feature is classified according to the set of reference image features, so as to generate the output result. According to an exemplary embodiment of the disclosure, the CPN model is implemented by adopting the framework of the Kohonen Layer and the Grossberg Layer. However, the disclosure is not limited thereto.

At Step S370, the defect classifying module 124 may determine whether the first defect image is a qualified product image or an unqualified product image according to the output result of the defect classifying model. The criterion for determining whether the first defect image is a qualified product image or an unqualified product image is whether the defect can be overcome in a subsequent industrial manufacturing process. If the defect can be overcome in a subsequent industrial manufacturing process, the defect belongs to a qualified product. Otherwise, the defect belongs to an unqualified product.

For example, as described above, after the defect classifying model, the first cropped image is classified into one of various defect types, such as dander, dirt, incomplete release of a film, normal, broken circuit, short circuit, etc. Since defects such as dander, dirt, incomplete release of a film, etc. can be overcome through a cleaning process or packaging, the defect classifying module 124 may determine that the first defect image is a qualified product image if the defect falls into one of the above types. However, if the defect is a broken circuit or a short circuit, the defect classifying module 124 may determine that the first defect image is an unqualified product image.

By performing the board defect filtering method according to Steps S310 to S370, the board defect filtering device 100 may classify the first defect image into a qualified product image or an unqualified product image. Besides, the processing section 130 of the board defect filtering device 100 may respectively transmit the unqualified product images or transmit the unqualified product images in a batch to the VRS 20 for manual checking.

In the following, details about how the anti-deviation conversion on a circuit layout image is carried out at Step S340 will be described. Specifically, the anti-deviation conversion carried out on the circuit layout image by the circuit comparing module 122 includes derivation of a digital imaging magnification rate, a circuit layout image defect locating algorithm, and a circuit layout image defect comparing algorithm. These will be sequentially described in the following.

Derivation of the digital imaging magnification rate serves to modify the proportion of the first defect image according to the proportion of the circuit layout image. During the process of deriving the digital image magnification rate, firstly, the circuit comparing module 122 may look for the location corresponding to the defect image in the circuit layout image. A method of looking for the location includes, for example, finding the location having the defect by measuring a length. However, the disclosure is not limited thereto.

Then, the circuit comparing module 122 measures a feature corresponding to the defect or a vicinity of the defect, i.e. a preset circle. Besides, the circuit comparing module 122 also measures a diameter of a corresponding circle in the defect image. In this way, the circuit comparing module 122 may obtain a ratio between the circuit layout image and the defect image according to the circles in the circuit layout image and the defect image. For example, in a circuit layout image with 10,000 dots per inch (DPI), the diameter of the circle chosen by the circuit comparing module 122 is 37 pixels, whereas the diameter of the corresponding circle in the defect image is 120 pixels. In this way, the circuit comparing module 122 is able to infer that a ratio of the circuit layout image to the defect image is 1:3.2432 according to the diameter of the circle in the circuit layout image being 37 pixels and the diameter of the circle in the defect image being 120 pixels, and thereby infer that the defect image is an image of 32,432 DPI.

The circuit layout image defect locating algorithm serves to compare the circuit layout image and the first defect image to obtain the location of the first defect image relative to the circuit layout image. In the circuit layout image defect locating algorithm, the circuit comparing module 122 may choose a plurality of image patterns, and each of the image patterns is an image pattern appearing only once in a cell to which the image pattern belongs. Then, the circuit comparing module 122 may receive the user's manual correction to the deviation of the location of the image pattern and thereby modify a predetermined formula. The circuit comparing module 122 then further verifies coordinate values with the circuit layout image and performs a local imaging test.

The circuit layout image defect comparing algorithm serves to correct the location of the first defect image relative to the circuit layout algorithm, so as to obtain the defect location. In the process of the circuit layout image defect comparing algorithm, an anti-deviation algorithm is adopted. In the anti-deviation algorithm, first of all, the circuit comparing module 122 may convert a defect image into a binarized defect image and generate a binarized sample image from the circuit layout image. Then, the circuit comparing module 122 may perform image calibration according to a maximally enhanced correlation coefficient (ECC) to obtain a transform matrix. Subsequently, the circuit comparing module 122 may output a modified image according to the transform matrix.

It should be noted that, in an exemplary embodiment of the disclosure, the adopted circuit layout image is a colored circuit layout image. Moreover, at Step S340, the circuit comparing module 122 may further analyze a defect color level of the first defect image. The circuit comparing module 122 may determine whether the defect color level is the same as the color of a board material or the color of a wiring material of the circuit layout image. When the defect color level is the same as the color of the board material or the color of the wiring material, the circuit comparing module 122 may determine that the first defect image is an unqualified product image.

Specifically, when the color of the defect is the same as the color of the board material, it is likely that a location with which a wiring material should be coated is not coated with the wiring material and therefore a broken circuit occurs. When the color of the defect is the same as the color of the wiring material, it is likely that a location with which a wiring material should not be coated is coated with the wiring material and therefore a short circuit occurs. Thus, in these two conditions, the circuit comparing module 122 may directly determine that the first defect image is an unqualified product image to reduce the time required for making a classification judgment on the image.

In view of the foregoing, the board defect filtering device and the board defect filtering method according to the embodiments of the disclosure are able to determine the type to which the defect of the defect image belongs by cross-comparing the circuit layout image and the defect list, thereby determining whether the defect image is a qualified product image or an unqualified product image. In particular, in the board defect filtering device and the board defect filtering method according to the embodiments of the disclosure, the defect image is further cropped to retain the image actually related to the defect. Compared with the defect image without cropping, classifying the cropped defect image increases the accuracy of classification and therefore also increases the accuracy on determining whether the defect image is a qualified product image or an unqualified product image. In this way, the number of cases of misjudgment on the defect list is lowered, and the workload of manually double-checking is effectively reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A board defect filtering method, comprising:
   receiving a defect list;
   obtaining a plurality of defect images of a plurality of defect records on the defect list;
   receiving a circuit layout image;
   analyzing a defect location of a first defect image of the defect images according to the circuit layout image;
   cropping the first defect image according to the defect location of the first defect image to obtain a first cropped defect image;
   inputting the first cropped defect image to a defect classifying model;
   determining whether the first defect image is a qualified product image or an unqualified product image according to an output result of the defect classifying model; and
   transmitting records belonging to the unqualified product image in the defect list to a verified repaired system,
   wherein if the output result corresponding to the first defect image is overcame in a subsequent industrial manufacturing process, the first defect image is marked as a qualified product and is not transmitted to the verified repaired system,
   wherein analyzing the defect location of the first defect image of the defect images according to the circuit layout image comprises:
   adjusting a proportion of the first defect image according to a proportion of the circuit layout image;
   comparing the circuit layout image and the first defect image to obtain a location of the first defect image relative to the circuit layout image; and
   correcting the location of the first defect image relative to the circuit layout image to obtain the defect location.

2. The board defect filtering method as claimed in claim 1, wherein inputting the first cropped defect image to the defect classifying model comprises:
   inputting the first defect image to a convolutional neural network model to extract a defect feature of the first defect image; and
   classifying the defect feature according to a set of reference image features to generate the output result.

3. The board defect filtering method as claimed in claim 1, wherein inputting the first cropped defect image to the defect classifying model comprises:
   extracting a defect profile of the first cropped defect image;
   analyzing the first cropped defect image according to the defect profile, so as to generate a defect quantifying feature; and
   classifying the defect quantifying feature according to a set of reference image features to generate the output result.

4. The board defect filtering method as claimed in claim 1, further comprising:
   analyzing a defect color level of the first defect image;
   determining whether the defect color level is the same as a color of a board material or a color of a wiring material of the circuit layout image; and
   determining that the first defect image is the unqualified product image when the defect color level is the same as the color of the board material or the color of the wiring material.

5. A non-transitory computer readable recording medium, storing at least one program code, wherein when an electronic device loads and executes the program code, the board defect filtering method as claimed in claim 1 may be completed.

6. A board defect filtering device, comprising:
   an input circuit, receiving a defect list and a circuit layout image, wherein the defect list comprises a plurality of defect records, the input circuit further obtains a plurality of defect images of the defect records;
   a memory; and
   a central processing unit, connected to the input circuit and the memory, wherein the central processing unit configured to:
   analyze a defect location of a first defect image of the defect images according to the circuit layout image, and cropping the first defect image according to the defect location of the first defect image to obtain a first cropped defect image;
   input the first cropped defect image to a defect classifying model;
   determine whether the first defect image is a qualified product image or an unqualified product image according to an output result of the defect classifying model; and
   transmit records belonging to the unqualified product image in the defect list to a verified repaired system,
   wherein if the output result corresponding to the first defect image is overcame in a subsequent industrial manufacturing process, the first defect image is marked as a qualified product and is not transmitted to the verified repaired system,
   wherein the central processing unit is further configured to:
   adjust a proportion of the first defect image according to a proportion of the circuit layout image,
   compare the circuit layout image and the first defect image to obtain a location of the first defect image relative to the circuit layout image, and
   correct the location of the first defect image relative to the circuit layout image to obtain the defect location.

7. The board defect filtering device as claimed in claim 6, wherein the central processing unit is further configured to:
   input the first defect image to a convolutional neural network model to extract a defect feature of the first defect image, and
   classify the defect feature according to a set of reference image features to generate the output result.

8. The board defect filtering device as claimed in claim 6, wherein the central processing unit is further configured to:
   extract a defect profile of the first cropped defect image,
   analyze the first cropped defect image according to the defect profile, so as to generate a defect quantifying feature, and
   classify the defect quantifying feature according to a set of reference image features to generate the output result.

9. The board defect filtering device as claimed in claim 6, wherein the central processing unit is further configured to:
   analyze a defect color level of the first defect image,
   determine whether the defect color level is the same as a color of a board material or a color of a wiring material of the circuit layout image, and
   determine that the first defect image is the unqualified product image when the defect color level is the same as the color of the board material or the color of the wiring material.

\* \* \* \* \*